United States Patent [19]
Muraoka

[11] Patent Number: 5,796,725
[45] Date of Patent: Aug. 18, 1998

[54] ECHO CANCELLER CAPABLE OF CANCELLING AN ECHO SIGNAL AT A HIGH SPEED

[75] Inventor: Shinya Muraoka, Tokyo, Japan

[73] Assignee: NEC Corporation, Tokyo, Japan

[21] Appl. No.: 521,434

[22] Filed: Aug. 30, 1995

[30] Foreign Application Priority Data

Aug. 31, 1994 [JP] Japan ................ 6-206185

[51] Int. Cl.$^6$ .................................... H04B 3/23
[52] U.S. Cl. .......................... 370/290; 379/411
[58] Field of Search ................ 370/32.1; 379/406, 379/410, 411

[56] References Cited

U.S. PATENT DOCUMENTS

| | | | |
|---|---|---|---|
| 3,894,200 | 7/1975 | Campanella et al. | 379/406 |
| 4,823,382 | 4/1989 | Martinez | 379/411 |
| 4,894,820 | 1/1990 | Miyamoto et al. | 370/289 |
| 5,343,521 | 8/1994 | Jullien et al. | 370/290 |
| 5,343,522 | 8/1994 | Yatrou et al. | 370/32.1 |
| 5,351,291 | 9/1994 | Menez et al. | 370/32.1 |
| 5,396,517 | 3/1995 | Yedid et al. | 370/32.1 |
| 5,477,534 | 12/1995 | Kusano | 370/32.1 |

FOREIGN PATENT DOCUMENTS

| | | |
|---|---|---|
| 0446917 | 9/1991 | European Pat. Off. . |
| 0604948 | 7/1994 | European Pat. Off. . |

*Primary Examiner*—Douglas W. Olms
*Assistant Examiner*—Min Jung
*Attorney, Agent, or Firm*—Sughrue, Mion, Zinn, Macpeak & Seas

[57] ABSTRACT

An echo canceller (30) cancels an echo signal produced on a transmission path (14) on the basis of a received signal received through a reception path (15). The echo canceller comprises an adaptive filter (31) for producing a pseudo-echo signal from the received signal in accordance with tap gains. A producing section (19, 20) produces an error signal representative of an error level between the echo signal and the pseudo-echo signal. A supplying section (21, 32) supplies the adaptive filter with selected tap gains stored in a memory section (18) when the error level is less than a predetermined threshold level. The adaptive filter renews the selected tap gains into renewal tap gains in accordance with the received signal and the error signal to store the renewal tap gains of the selected tap gains in the memory section.

15 Claims, 2 Drawing Sheets

1

ECHO CANCELLER CAPABLE OF CANCELLING AN ECHO SIGNAL AT A HIGH SPEED

BACKGROUND OF THE INVENTION

This invention relates to an echo canceller for cancelling an echo signal produced on a transmission path on the basis of a received signal which is received through a reception path.

In general, an echo signal may be produced on a transmission path on the basis of a received signal which is received through a reception path in case where the reception path is connected to the transmission path through a hybrid circuit. In order to cancel the echo signal, an echo canceller is connected to the hybrid circuit between the reception path and the transmission path.

A conventional echo canceller comprises an adaptive filter which may be, for example, a transversal filter. The adaptive filter is supplied with the received signal through the reception path to filter the received signal into a filtered signal in accordance with first through N-th controllable tap gains, where N represents a positive integer which is not less than one. The filtered signal may be called a pseudo-echo signal.

The conventional echo canceller further comprises a producing section supplied with the echo signal through the transmission path. The producing section is further supplied with the pseudo-echo signal. The producing section produces an error signal representative of an error level between the echo signal and the pseudo-echo signal. The adaptive filter renews the first through the N-th controllable tap gains into first through N-th renewal controllable tap gains in accordance with the received signal and the error signal as known in the art. Thereafter, the adaptive filter filters the received signal into the pseudo-echo signal in accordance with the first through the N-th renewal controllable tap gains.

As described above, the echo signal is received through the transmission path at the echo canceller. When taking a delay time of the transmission path in consideration, it is necessary to make the positive integer N be very large in order to cancel the echo signal as desired. Therefore, it is particularly difficult to cancel the echo signal at a high speed because the conventional echo canceller must control the first through the N-th controllable tap gains.

SUMMARY OF THE INVENTION

It is therefore an object of this invention to provide an echo canceller capable of cancelling an echo signal at a high speed.

It is another object of this invention to provide an echo canceller capable of controlling tap gains with a simple structure.

Other objects of this invention will become clear as the description proceeds.

In describing this invention, it is possible to understand that an echo canceller for cancelling an echo signal produced on a transmission path on the basis of a received signal which is received through a reception path.

According to this invention, the echo canceller comprises first producing means for producing an error signal representative of an error level between the echo signal and a pseudo-echo signal, second producing means supplied with the error signal for producing selected ones of first through N-th tap gains as output tap gains when the error level is less than a predetermined threshold level, where N represents a positive integer which is not less than one, the second producing means producing the first through the N-th tap gains as the output tap gains when the error level is not less than the predetermined threshold level, and adaptive filter means for filtering the received signal into a filtered signal in accordance with the output tap gains to produce the filtered signal as the pseudo-echo signal, the adaptive filter means renewing the output tap gains into renewal tap gains in accordance with the received signal and the error signal.

DESCRIPTION OF THE PREFERRED EMBODIMENT

Figure 1:
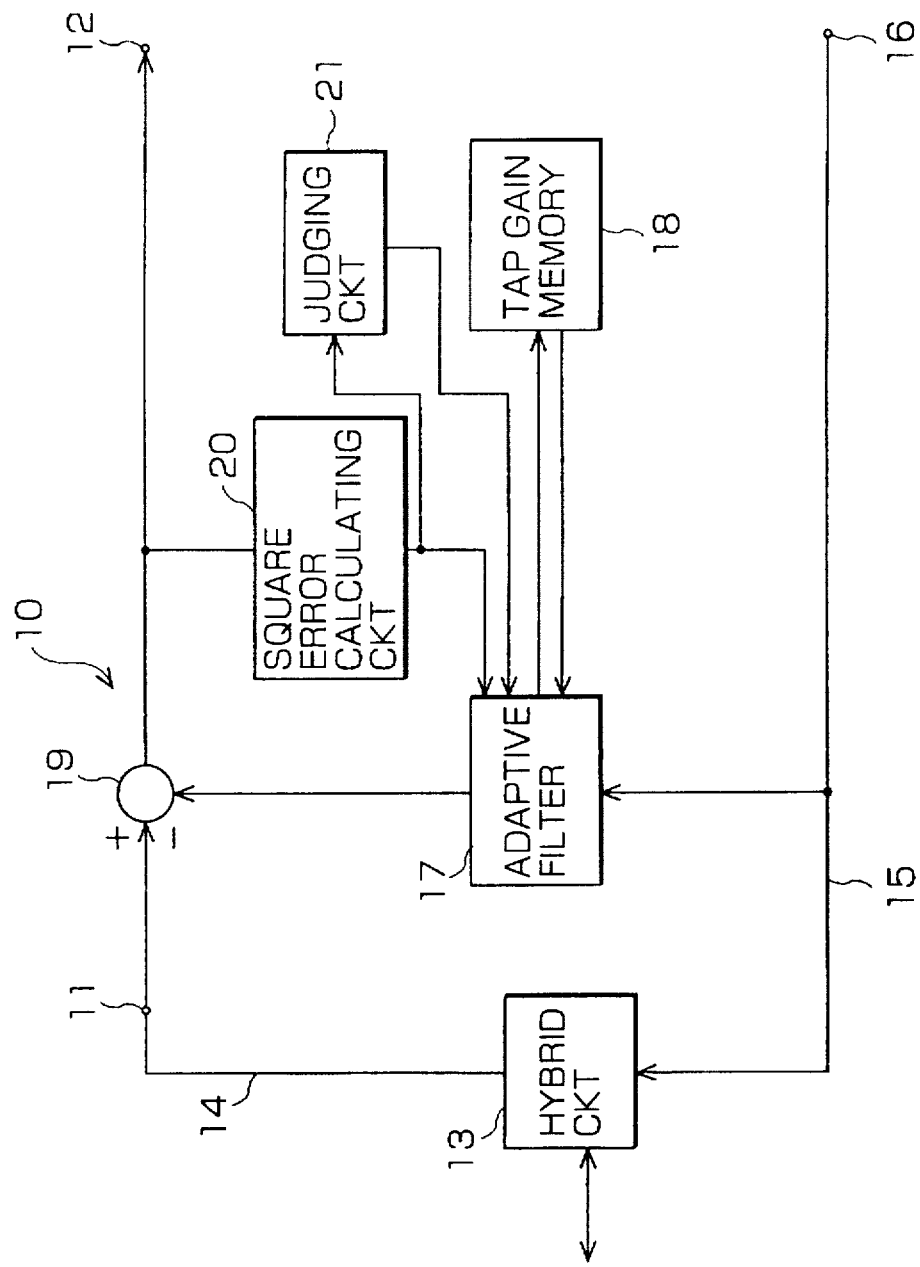
FIG. 1 is a block diagram of a conventional echo canceller.

Referring to FIG. 1, description will first be made with regards to a conventional echo canceller 10 to better understand of this invention. The echo canceller 10 has input and output terminals 11 and 12. The input terminal 11 is connected to a hybrid circuit 13 through a transmission path 14. The hybrid circuit 13 is connected to a reception path 15 which is connected to a reception terminal 16. Namely, the echo canceller 10 is connected to the hybrid circuit 13 between the transmission path 14 and the reception path 15. The hybrid circuit 13 is further connected to a terminal device such as a telephone device (not shown). A transmitted signal is supplied to the reception terminal 16 as a received signal to be delivered to the terminal device through the hybrid circuit 13. The transmitted signal may be, for example, a digital signal which is produced by sampling an analog signal at a sampling frequency f. The analog signal may be a speech signal.

An echo signal is inevitably produced on the transmission path 14 on the basis of the received signal as known in the art. The echo signal is supplied to the input terminal 11. The echo canceller 10 is operable to cancel the echo signal.

The echo canceller 10 comprises an adaptive filter 17 which may be, for example, a transversal filter. The echo canceller 10 further comprises a tap gain memory 18 for memorizing first through N-th tap gains as first through N-th memorized tap gains, where N represents a positive integer which is not less than one. The tap gain memory 18 supplies the adaptive filter 17 with the first through the N-th memorized tap gains as first through N-th output tap gains. In accordance with the first through the N-th output tap gains, the adaptive filter 17 filters the received signal into a filtered signal to produce the filtered signal as a pseudo-echo signal as known in the art. More particularly, the adaptive filter 17 produces the pseudo-echo signal in accordance with Equation given by:

$$HX = \sum_{i=1}^{N} (HRi \times Xj) \qquad (1)$$

where HX represents the pseudo-echo signal. HRi represents an i-th output tap gain (i is a variable between one and N, both inclusive). Xj represents a delayed signal which is produced by delaying the received signal j times at a delay time (1/f) (j represents a variable between zero and (N−1), both inclusive).

The pseudo-echo signal is supplied to a subtracter 19. The subtracter 19 is supplied with the echo signal through the input terminal 11. The subtracter 19 subtracts the pseudo-echo signal from the echo signal to produce a difference signal representative of a difference level between the echo signal and the pseudo-echo signal. The difference signal is supplied to a square error calculating circuit 20.

The square error calculating circuit 20 calculates a square error in accordance with the difference signal to produce an error signal representative of an error level between the echo signal and the pseudo-echo signal. The error signal is delivered to the adaptive filter 17 and a judging circuit 21.

The judging circuit 21 judges whether or not the error level is less than a predetermined threshold level. When the error level is not less than the predetermined threshold level, the judging circuit 21 supplies the adaptive filter 17 with a first control signal which may be represented by binary one. When the error level is less than the predetermined threshold level, the judging circuit 21 supplies the adaptive filter 17 with a second control signal which may be representative of zero.

Responsive to any one of the first and the second control signals, the adaptive filter 17 produces first through N-th renewal tap gains in accordance with the received signal and the error signal. More specifically, the adaptive filter 17 renews the first through the N-th output tap gains into the first through the N-th renewal tap gains on the basis of Equation given by:

$$HWi = HRi + \mu \sum_{i=1}^{N} (E2 \times Xj) \quad (2)$$

where HWi represents an i-th renewal tap gain. E2 represents the error signal. μ represents a control coefficient by which convergence of the echo signal is determined.

The control coefficient μ is one of a first and second parameter. The first parameter is greater than the second parameter. The adaptive filter 17 selects one of first and second parameters as the control coefficient. More particularly, the adaptive filter 17 selects the first parameter as the control coefficient in response to the first control signal. Responsive to the second control signal, the adaptive filter 17 selects the second parameter as the control coefficient.

After the adaptive filter 17 calculates the first through the N-th renewal tap gains as described above, the adaptive filter 17 stores the first through the N-th renewal tap gains as the first through the N-th memorized tap gains in the tap gain memory 18.

By repeating renewal of the tap gains in a manner similar to the above-mentioned manner, the pseudo-echo signal is equivalent to the echo signal. As a result, the difference signal has a minimum difference level. Namely, the echo signal is cancelled on the transmission path.

However, the positive integer N must be very large in the echo canceller 10 in order to cancel the echo signal when taking the delay time of the transmission path into consideration. When positive integer N is very large, the adaptive filter 17 carries out very much calculation on renewing the tap gains. Therefore, it is difficult to cancel the echo signal at a high speed in the echo canceller 10.

Figure 2:
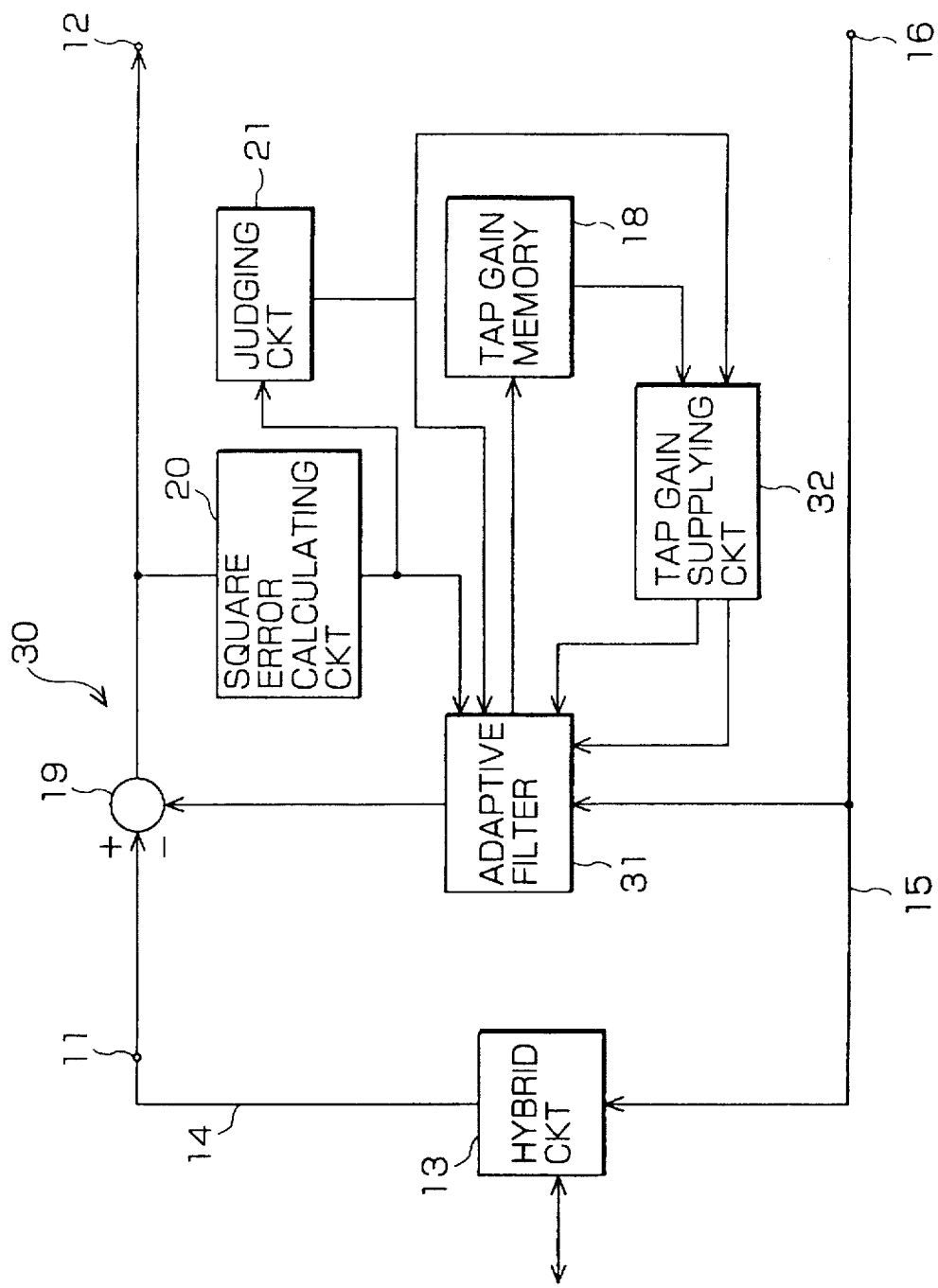
FIG. 2 is a block diagram of an echo canceller according to a preferred embodiment of this invention.

Referring to FIG. 2, description will proceed to an echo canceller according to a preferred embodiment of this invention. The illustrated echo canceller is different in structure from the echo canceller 10 illustrated in FIG. 1 and is therefore designated by new reference numerals as appropriate. The echo canceller 30 comprises similar parts which are designated by like reference numerals and are operable with likewise named and denoted signals. In the echo canceller 30, the adaptive filter is different in function from the adaptive filter 17 illustrated in FIG. 1 and is therefore designated afresh by a reference numeral 31. The echo canceller 30 further comprises a tap gain supplying circuit 32 which will later be described.

At an initial state, the tap gain supplying circuit 32 is supplied with the first through the N-th memorized tap gains from the tap gain memory 18 to deliver the first through the N-th memorized tap gains as output tap gains to the adaptive filter 31.

As described in conjunction with FIG. 1, the adaptive filter 31 produces the pseudo-echo signal by Equation (1) in accordance with the output tap gains. The subtracter 19 subtracts the pseudo-echo signal from the echo signal to produce the difference signal representative of the difference level. The square error calculating circuit 20 produces the error signal representative of the error level.

The judging circuit 21 selectively produces the first and the second control signals as described in conjunction with FIG. 1. In FIG. 2, the judging circuit 21 is connected to the adaptive filter 31 and the tap gain supplying circuit 32. Responsive to any one of the first and the second control signals, the adaptive filter 31 renews the first through the N-th output tap gains into the first through the N-th renewal tap gains in accordance with the received signal and the error signal as described in conjunction with FIG. 1. Namely, the adaptive filter 31 produces the first through the N-th renewal tap gains by Equation (2). The adaptive filter 31 stores the first through the N-th renewal tap gains as the first through the N-th memorized tap gains in the tap gain memory 18.

As described above, the tap gain supplying circuit 32 is connected to the judging circuit 21. The tap gain supplying circuit 32 is supplied with the first through the N-th memorized tap gains from the tap gain memory 18. Supplied with the first control signal from the judging circuit 21, the tap gain supplying circuit 32 supplies the first through the N-th memorized tap gains as the first through the N-th output tap gains to the adaptive filter 31.

Supplied with the second control signal from the judging circuit 21, the tap gain supplying circuit 32 compares each of the first through the N-th memorized tap gains with a predetermined value to selectively supply the adaptive filter 31 with selected tap gains of the first through the N-th memorized tap gains as output tap gains. More particularly, the tap gain supplying circuit 32 supplies the first memorized tap gain as the first output tap gain to the adaptive filter 31 when the first memorized tap gain is greater than the predetermined value. When the first memorized tap gain is not greater than the predetermined value, the tap gain supplying circuit 32 does not allow the first memorized tap gain to pass therethrough. When the first memorized tap gain is not greater than the predetermined value, the tap gain supplying circuit 32 may supply zero value as the first output tap gain to the adaptive filter 31.

Similarly, the tap gain supplying circuit 32 supplies a K-th memorized tap gain as a K-th output tap gain to the adaptive filter 31 when the K-th memorized tap gain is greater than the predetermined value, where K is variable between one and N, both inclusive. When the K-th memorized tap gain is not greater than the predetermined value, the tap gain supplying circuit 32 does not allow the K-th memorized tap gain to pass therethrough. When the the K-th memorized tap gain is not greater than the predetermined value, the tap gain supplying circuit 32 may supply zero value as the K-th output tap gain to the adaptive filter 31.

In addition, the tap gain supplying circuit 32 selectively supplies one of primary and subsidiary flag signals in accordance with a result of comparison of each of the first through the N-th memorized tap gains. More specifically, the tap gain supplying circuit 32 supplies the adaptive filter 31 with a k-th primary flag signal, which may be represented by one when the K-th memorized tap gain is greater than the predetermined value. When the K-th memorized tap gain is not greater than the predetermined value, the tap gain supplying circuit 32 supplies the adaptive filter 31 with a k-th subsidiary flag signal, which may be represented by zero.

When the adaptive filter 31 is supplied with the k-th primary flag signal, the adaptive filter 31 uses the k-th output tap gain on producing the pseudo-echo signal. Otherwise, the adaptive filter 31 makes the k-th output tap gain be an unusable tap gain on producing the pseudo-echo signal when the adaptive filter 31 is supplied with the k-th subsidiary flag signal.

As readily understood from the above description, the adaptive filter 31 filters the received signal in accordance with the selected tap gains of the first through the N-th memorized tap gains to produce the pseudo-echo signal when the error level is less than the predetermined threshold level.

Furthermore, the adaptive filter 31 renews the k-th output tap gain into a k-th renewal tap gain in accordance with Equation (2) when the adaptive filter 31 is supplied with the k-th primary flag signal. When the adaptive filter 31 is supplied with the k-th subsidiary flag signal, the adaptive filter 31 does not carry out the renewal of the k-th output tap gain. Namely, the renewal is not carried out at the k-th output tap gain in the adaptive filter 31 when the adaptive filter 31 is supplied with the k-th subsidiary flag signal.

As readily understood from the above description, the adaptive filter 31 renews the selected gains of the first through the N-th memorized tap gains into the renewal tap gains by Equation (2) in response any one of the first and second control signals. The adaptive filter 31 stores the renewal tap gains of selected ones of the first through the N-th memorized tap gains in the tap gain memory 18.

More particularly, the adaptive filter has the control coefficient which comprises first and second parameters. The first parameter is greater than the second parameter. On carrying out renewal of the selected ones of the first through the N-th memorized tap gains by using Equation (2), the adaptive filter 31 selects the first parameter as the control coefficient in response to the first control signal. Otherwise, the adaptive filter 31 selects the second parameter as the control coefficient in response to the second control signal.

It will be assumed that the number of tap gains less than the predetermined value is five when the tap gain supplying circuit 32 is supplied with the second control signal. In Equation (1), the number of multiplications is equal to (N-5). Similarly, the number of multiplications is equal to (N-5) in Equation (2). By repeating renewal of the memorized tap gains, each of the memorized tap gains gradually becomes small. Therefore, the number of the memorized tap gains less than the predetermined value gradually increases. Inasmuch as the number of calculations has a maximum number of 2(N-5) at both steps of production of the pseudo-echo signal and renewal of the memorized tap gains, it is possible to reduce the number of calculations at the step of production of the pseudo-echo signal and the step of renewal of the tap gains. Namely, it is possible to cancel the echo signal at a high speed while reducing the number of calculations.

As readily understood from the above description, the subtracter 19 and the square error calculating circuit 20 are collectively operable as a first producing section. The judging circuit 21, the tap gain memory 18, and the tap gain supplying circuit are collectively operable as a second producing section.

What is claimed is:

1. An echo canceller for cancelling an echo signal produced on a transmission path on the basis of a received signal which is received through a reception path, said echo canceller comprising:

first producing means for producing an error signal representative of an error level between said echo signal and a pseudo-echo signal;

second producing means, supplied with said error signal, for producing selected tap gains of first through N-th tap gains as output tap gains when said error level is less than a predetermined threshold level, where N represents a positive integer which is not less than one and, said second producing means producing said first through N-th tap gains as said output tap gains when said error level is not less than said predetermined threshold level; and adaptive filter means for filtering said received signal into a filtered signal in accordance with said output tap gains to produce said filtered signal as said pseudo-echo signal, said adaptive filter means renewing said output tap gains into renewal tap gains in accordance with said received signal and said error signal.

2. An echo canceller as claimed in claim 1, wherein said second producing means comprises:

judging means for judging whether or not said error level is less than said predetermined threshold level to produce a first control signal when said error level is not less than said predetermined threshold level, said judging means producing a second control signal when said error level is less than said predetermined threshold level;

memory means for memorizing said first through said N-th tap gains as memorized tap gains; and tap gain supplying means for supplying the selected tap gains of said memorized tap gains as said output tap gains in response to said second control signal, said tap gain supplying each of means supplying said memorized tap gains as said output tap gains in response to said first control signal.

3. An echo canceller as claimed in claim 2, wherein said adaptive filter means stores each of said renewal tap gains in said memory means when the output tap gains include each of said memorized tap gains and wherein, said adaptive filter means selectively stores selected renewal tap gains in said memory means when the output tap gains include selected tap gains of said memorized tap gains.

4. An echo canceller as claimed in claim 2, wherein said tap gain supplying means compares each of said memorized tap gains with a predetermined value in response to said second control signal to produce the selected tap gains of the memorized tap gains as said output tap gains.

5. An echo canceller as claimed in claim 4, wherein said tap gain supplying means supplies said adaptive filter means with a k-th tap gain as one of said output tap gains when said k-th tap gain is not less than said predetermined value, where k is a variable between one and N (both inclusive).

6. An echo canceller as claimed in claim 5, wherein said tap gain supplying means further supplies said adaptive filter means with a k-th primary flag signal when said k-th tap gain is not less than said predetermined value, said tap gain supplying means supplying said adaptive filter means with a k-th subsidiary flag signal when said k-th tap gain is less than said predetermined value.

7. An echo canceller as claimed in claim 6, wherein said adaptive filter means uses said k-th tap gain in response to said k-th primary flag signal on producing said pseudo-echo signal.

8. An echo canceller as claimed in claim 6, wherein said adaptive filter means makes said k-th tap gain be an unusable tap gain in response to said k-th subsidiary flag signal.

9. An echo canceller as claimed in any one of claims 1 to 8, wherein said adaptive filter means uses a control coefficient to renew the output tap gains into renewal tap gains in accordance with said received signal and said error signal.

10. An echo canceller as claimed in claim 9, wherein:

said adaptive filter means has first and second parameters;

said adaptive filter means selecting said first parameter as said control coefficient in response to said first control signal, said adaptive filter means selecting said second parameter as said control coefficient in response to said second control signal.

11. An echo canceller as claimed in claim 10, wherein said first parameter is greater than said second parameter.

12. An echo canceller as claimed in claim 9, wherein said first producing means comprises:

subtracter means for subtracting said pseudo-echo signal from said echo signal to produce a difference signal representative of a difference level between said echo signal and said pseudo-echo signal; and error level calculating means for calculating an error level in accordance with said difference signal to produce said error signal.

13. An echo canceller as claimed in claim 10, wherein said first producing means comprises:

subtracter means for subtracting said pseudo-echo signal from said echo signal to produce a difference signal representative of a difference level between said echo signal and said pseudo-echo signal; and error level calculating means for calculating an error level in accordance with said difference signal to produce said error signal.

14. An echo canceller as claimed in claim 11, wherein said first producing means comprises:

subtracter means for subtracting said pseudo-echo signal from said echo signal to produce a difference signal representative of a difference level between said echo signal and said pseudo-echo signal; and error level calculating means for calculating an error level in accordance with said difference signal to produce said error signal.

15. An echo canceller as claimed in any one of claims 1 to 8, wherein said first producing means comprises:

subtracter means for subtracting said pseudo-echo signal from said echo signal to produce a difference signal representative of a difference level between said echo signal and said pseudo-echo signal; and error level calculating means for calculating an error level in accordance with said difference signal to produce said error signal.

* * * * *